(12) United States Patent
Toyama (10) Patent No.: US 11,180,193 B2
(45) Date of Patent: Nov. 23, 2021

(54) SENSOR DEVICE

(71) Applicant: JTEKT CORPORATION, Osaka (JP)

(72) Inventor: Yuichi Toyama, Owariasahi (JP)

(73) Assignee: JTEKT CORPORATION, Osaka (JP)

( * ) Notice: Subject to any disclaimer, the term of this patent is extended or adjusted under 35 U.S.C. 154(b) by 100 days.

(21) Appl. No.: 16/823,682

(22) Filed: Mar. 19, 2020

(65) Prior Publication Data

US 2020/0307694 A1 Oct. 1, 2020

(30) Foreign Application Priority Data

Mar. 29, 2019 (JP) .............................. JP2019-067943

(51) Int. Cl.
| | |
|---|---|
| *B62D 5/02* | (2006.01) |
| *B62D 15/02* | (2006.01) |
| *B62D 5/04* | (2006.01) |
| *G01B 5/24* | (2006.01) |
| *G01D 5/04* | (2006.01) |
| *G01D 5/14* | (2006.01) |
| *G01D 11/24* | (2006.01) |

(52) U.S. Cl.
CPC ........... *B62D 15/0215* (2013.01); *B62D 5/04* (2013.01); *G01B 5/24* (2013.01); *G01D 5/04* (2013.01); *G01D 5/145* (2013.01); *G01D 11/245* (2013.01)

(58) Field of Classification Search
CPC ........ B26D 15/0215; B26D 5/04; G01B 5/24; G01D 5/04; G01D 5/145
See application file for complete search history.

(56) References Cited

U.S. PATENT DOCUMENTS

| | | | | |
|---|---|---|---|---|
| 5,362,284 | A  * | 11/1994 | Brewer | ................... F16H 48/10 |
| | | | | 475/249 |
| 9,086,269 | B2 * | 7/2015 | Takayanagi | .............. G01B 7/30 |
| 10,845,259 | B2 * | 11/2020 | Toyama | ............ B62D 15/0215 |
| 2014/0208890 | A1 | 7/2014 | Takayanagi et al. | |

FOREIGN PATENT DOCUMENTS

| | | |
|---|---|---|
| EP | 1367360 A1 | 12/2003 |
| JP | 2007-192609 A | 8/2007 |
| JP | 2010-286299 A | 12/2010 |
| JP | 2014-144753 A | 8/2014 |

OTHER PUBLICATIONS

May 7, 2020 Extended European Search Report issued in European Patent Application No. 20165863.0.

* cited by examiner

*Primary Examiner* — Reena Aurora
(74) *Attorney, Agent, or Firm* — Oliff PLC

(57) ABSTRACT

A sensor device includes a main driving gear, a driven gear, a biasing member, a support member, a rotational angle sensor, and a magnetic shield. The driven gear includes a gear portion and a shaft portion. The shaft portion is provided with a permanent magnet. The biasing member is configured to bias the driven gear toward the main driving gear. The support member supports the driven gear and the biasing member. The magnetic shield rotatably surrounds the shaft portion. The biasing member biases the driven gear toward the main driving gear by biasing the magnetic shield toward the main driving gear. The sliding resistance between the magnetic shield and the driven gear is lower than the sliding resistance between the magnetic shield and the biasing member.

3 Claims, 5 Drawing Sheets

SENSOR DEVICE

CROSS-REFERENCE TO RELATED APPLICATION

This application claims priority to Japanese Patent Application No. 2019-067943 filed on Mar. 29, 2019, incorporated herein by reference in its entirety.

BACKGROUND

1. Technical Field

The present disclosure relates to a sensor device.

2. Description of Related Art

A variety of systems for improving travel stability, such as vehicle stability control systems and electronic control suspensions, are occasionally mounted on vehicles along with enhancement in the functionality of the vehicles. Such systems acquire the steering angle of a steering wheel as a piece of attitude information on the vehicle, and perform control on the basis of the attitude information such that the attitude of the vehicle is stabilized. Therefore, a rotational angle sensor device that detects the steering angle of the steering wheel is provided inside a steering column of the vehicle, for example.

Japanese Unexamined Patent Application Publication No. 2014-144753 (JP 2014-144753 A) describes a rotational angle sensor device that includes a main driving gear provided so as to be rotatable together with a steering shaft and two driven gears meshed with the main driving gear. The respective numbers of teeth of the two driven gears are different from each other. The rotational angle sensor device detects the respective rotational angles of the two driven gears using respective rotational angle sensors provided in correspondence with the two driven gears, and calculates the rotational angle of the steering shaft on the basis of such detected rotational angles. In the rotational angle sensor device described in JP 2014-144753 A, the presence of backlash between the main driving gear and the driven gears causes a large error in detecting the rotational angles, and thus the main driving gear and the driven gears are pressed against each other by a biasing member in order to reduce the backlash.

SUMMARY

If the main driving gear and the driven gears are pressed against each other by the biasing member, friction is generated between the main driving gear and the driven gears. Torque required for a driver to operate a steering wheel is increased by an amount corresponding to the generated friction. Consequently, the steering feel to be felt when the driver operates the steering wheel is reduced. Thus, it has been desired to suppress an increase in torque required for the driver to operate the steering wheel while allowing the main driving gear and the driven gears to be suitably meshed with each other.

An aspect of the present disclosure provides a sensor device including a main driving gear, a driven gear, a biasing member, a support member, a rotational angle sensor, and a magnetic shield. The main driving gear is provided so as to be rotatable together with a rotary shaft as a detection target. The driven gear includes a gear portion meshed with teeth of the main driving gear and a shaft portion that projects from a side surface of the gear portion. The shaft portion of the driven gear is provided with a permanent magnet. The biasing member is configured to bias the driven gear toward the main driving gear. The support member supports the driven gear and the biasing member. The rotational angle sensor is configured to generate an electric signal based on rotation of the driven gear. The magnetic shield rotatably surrounds the shaft portion. The biasing member biases the driven gear toward the main driving gear by biasing the magnetic shield toward the main driving gear. A sliding resistance between the magnetic shield and the driven gear is lower than a sliding resistance between the magnetic shield and the biasing member.

With the configuration described above, the biasing member biases the driven gear toward the main driving gear by biasing the magnetic shield toward the main driving gear. Consequently, more suitable meshing can be secured between the main driving gear and the driven gear. In addition, the biasing member biases the driven gear via the magnetic shield. Thus, it is possible to set the sliding resistance during rotation of the driven gear to be small compared to the case where the shaft portion of the driven gear is directly biased with no magnetic shield provided between the driven gear and the biasing member. The sliding resistance between the magnetic shield and the driven gear is lower than the sliding resistance between the magnetic shield and the biasing member. Therefore, it is possible to suppress an increase in torque required to rotate the rotary shaft. With the configuration described above, it is possible to both achieve suitable meshing between the main driving gear and the driven gear and suppress an increase in torque required to rotate the rotary shaft.

In the sensor device described above, a plurality of the driven gears may be provided. The number of the plurality of the driven gears may be two. The biasing member may include a coil portion supported by the support member, a first arm portion that biases one of the driven gears toward the main driving gear, and a second arm portion that biases the other of the driven gears toward the main driving gear.

With the configuration described above, two driven gears are biased toward the main driving gear by the first arm portion and the second arm portion of the biasing member. It is only necessary to provide a single member as the biasing member, and therefore an increase in the number of parts of the sensor device can be suppressed.

The sensor device described above may further include a torque sensor that detects torque that acts on the rotary shaft. With the configuration described above, it is possible to detect not only the rotational angle of the rotary shaft but also torque that acts on the rotary shaft by using a single sensor device.

With the sensor device according to the present disclosure, it is possible to suppress an increase in torque required to rotate the rotary shaft while allowing the main driving gear and the driven gear to be suitably meshed with each other.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
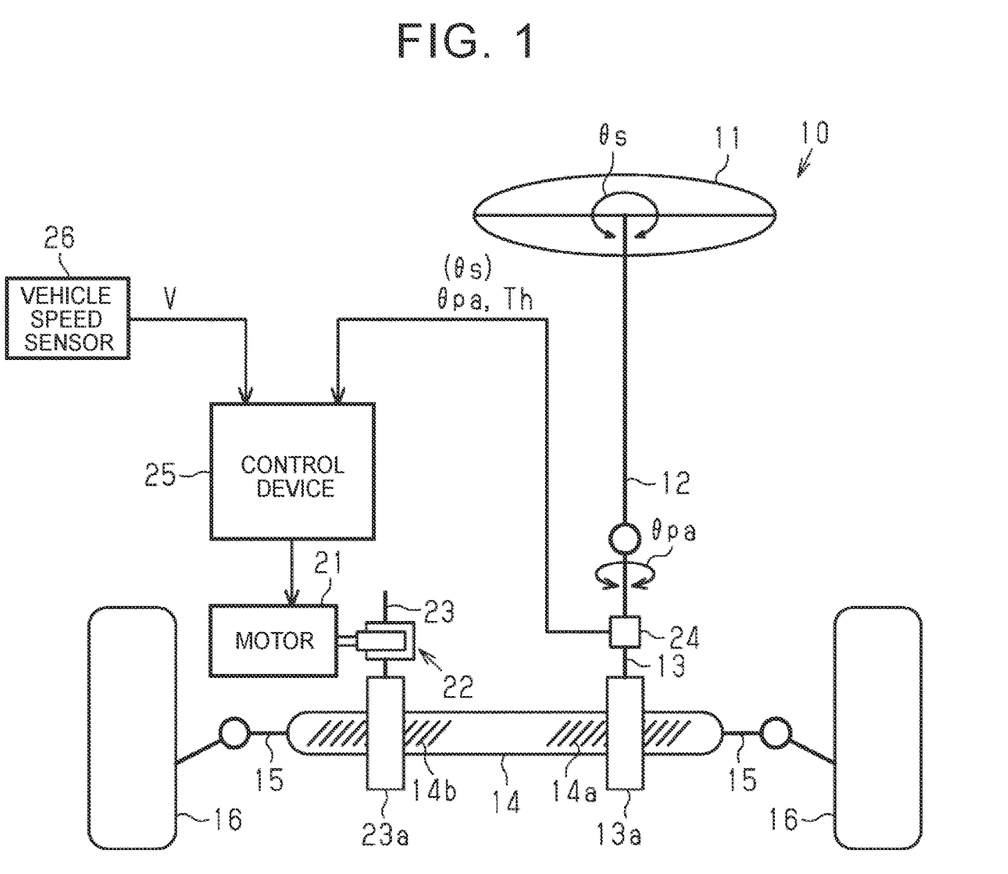
FIG. 1 is a schematic diagram of a steering device that includes a sensor device.

A sensor device according to an embodiment will be described with reference to the drawings. As illustrated in FIG. 1, a steering device 10 of a vehicle has a steering shaft 12 coupled to a steering wheel 11, a first pinion shaft 13, a steered shaft 14, a motor 21, a speed reduction mechanism 22, a second pinion shaft 23, a sensor device 24, and a control device 25. The first pinion shaft 13 is provided at an end portion of the steering shaft 12, on the opposite side of the steering shaft 12 from the steering wheel 11. Pinion teeth 13a of the first pinion shaft 13 are meshed with rack teeth 14a of the steered shaft 14 which extends in a direction crossing the first pinion shaft 13. Right and left steered wheels 16 are coupled to both ends of the steered shaft 14 via respective tie rods 15.

The motor 21 is a generation source of a steering assist force, and may be a three-phase brushless motor, for example. The motor 21 is coupled to the second pinion shaft 23 via the speed reduction mechanism 22. Pinion teeth 23a of the second pinion shaft 23 are meshed with rack teeth 14b of the steered shaft 14. Rotation of the motor 21 is reduced in speed by the speed reduction mechanism 22. A rotational force at the reduced speed is transferred from the second pinion shaft 23 to the first pinion shaft 13 via the steered shaft 14 as the steering assist force.

The sensor device 24 detects operation of the first pinion shaft 13. The sensor device 24 is a torque/angle sensor device that includes a combination of a torque sensor device that detects torque applied to the first pinion shaft 13 through a steering operation of the steering wheel 11 as steering torque Th and a rotational angle sensor device that detects a rotational angle θpa of the first pinion shaft 13 which may exceed 360 degrees as a steering angle θs.

The control device 25 retrieves the steering torque Th and the steering angle θs which are detected through the sensor device 24. The control device 25 retrieves a vehicle speed V detected through a vehicle speed sensor 26 provided in the vehicle. The control device 25 executes control for generating a steering assist force that matches the steering torque Th and the vehicle speed V through energization control performed on the motor 21. The control device 25 controls power supply to the motor 21 on the basis of the steering torque Th which is detected through the sensor device 24 and the vehicle speed V which is detected through the vehicle speed sensor 26. Consequently, the control device 25 assists a driver in performing a steering operation by providing the rotational force of the motor 21 to the first pinion shaft 13 as a steering assist force on the basis of an operation of the steering wheel 11 by the driver.

Figure 2:
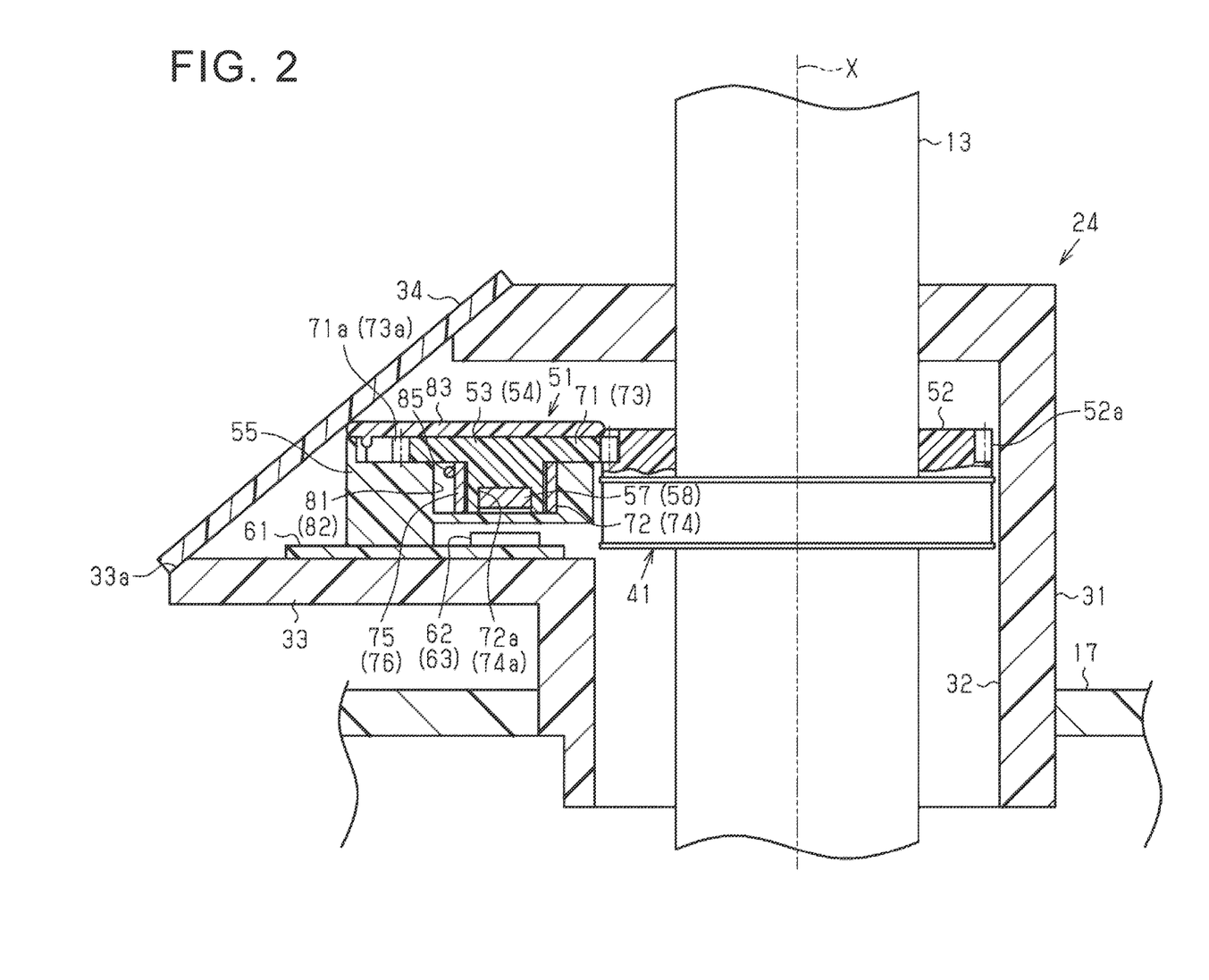
FIG. 2 is a sectional view taken along a plane including the axis of a first pinion shaft and including a line at an intermediate position between the axis of a first driven gear and the axis of a second driven gear.

The configuration of the sensor device 24 will be described. As illustrated in FIG. 2, the sensor device 24 has a sensor housing 31. The sensor housing 31 is attached to a gear housing 17 that houses the steered shaft 14 and the first pinion shaft 13. The sensor housing 31 has an insertion portion 32 and a housing portion 33 that communicate with each other. The insertion portion 32 has a tubular shape with its axis extending in an axial direction X of the first pinion shaft 13. The first pinion shaft 13 is inserted through the insertion portion 32. The first pinion shaft 13 has an input shaft on the side of the steering shaft 12, an output shaft on the side of the steered shaft 14, and a torsion bar that couples the input shaft and the output shaft to each other. The housing portion 33 is formed in a box shape, and projects from a side surface of the insertion portion 32 in a direction crossing the axial direction X. The housing portion 33 opens in a direction crossing the axial direction X. An opening portion 33a of the housing portion 33 is closed by a cover 34.

Figure 3:
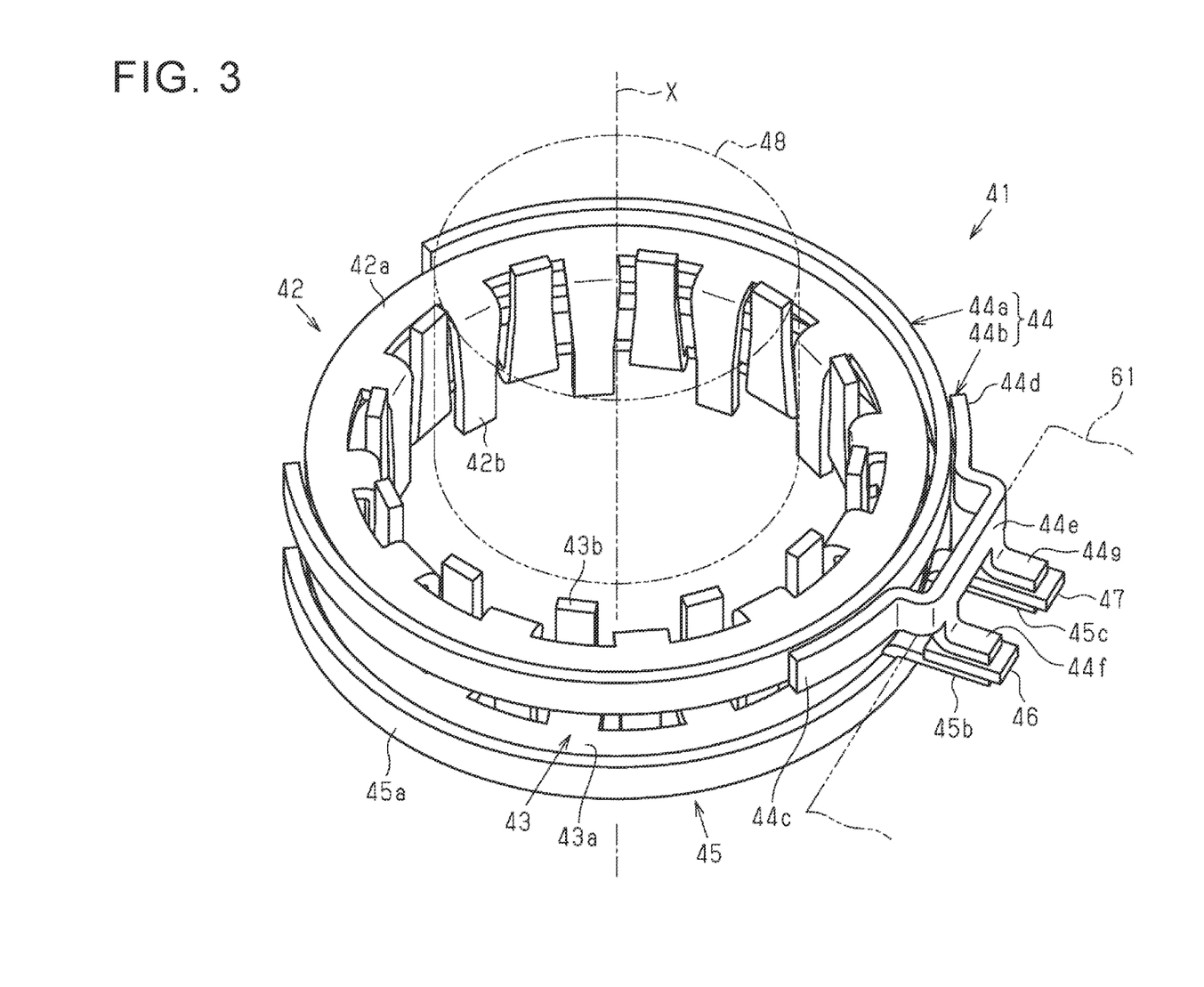
FIG. 3 is a schematic perspective view of a torque sensor device.

A torque sensor device 41 and a rotational angle sensor device 51 are provided inside the sensor housing 31. As illustrated in FIG. 3, the torque sensor device 41 has a first magnetic yoke 42, a second magnetic yoke 43, a first magnetism collection ring 44, a second magnetism collection ring 45, a first torque sensor 46, a second torque sensor 47, and a multi-pole magnet 48.

The multi-pole magnet 48 is fixed to the input shaft of the first pinion shaft 13. The multi-pole magnet 48 is formed in a tubular shape with S poles and N poles provided alternately along the circumferential direction thereof. The first magnetic yoke 42 and the second magnetic yoke 43 are fixed to the output shaft of the first pinion shaft 13. The multi-pole magnet 48, which is provided so as to be rotatable together with the first pinion shaft 13, is positioned inside the first magnetic yoke 42 and the second magnetic yoke 43. The first magnetic yoke 42 and the second magnetic yoke 43 form a magnetic circuit corresponding to the magnetic field of the multi-pole magnet 48.

The first magnetic yoke 42 has an annular portion 42a in a circular ring plate shape and a plurality of teeth 42b in a plate shape. The plurality of teeth 42b are provided at equal intervals along the inner peripheral edge of the annular portion 42a. The plurality of teeth 42b extend along the axial direction X of the first pinion shaft 13. Similarly to the first magnetic yoke 42, the second magnetic yoke 43 has an annular portion 43a in a circular ring plate shape and a plurality of teeth 43b. The teeth 42b of the first magnetic yoke 42 and the teeth 43b of the second magnetic yoke 43 extend in opposite directions in the axial direction X of the first pinion shaft 13, and are positioned alternately in the circumferential direction.

The first magnetism collection ring 44 and the second magnetism collection ring 45 are provided side by side in the axial direction X of the first pinion shaft 13. The first magnetism collection ring 44 and the second magnetism collection ring 45 are attached to the inside of the sensor housing 31. The first magnetism collection ring 44 is provided to surround the periphery of the first magnetic yoke 42. The second magnetism collection ring 45 is provided to surround the periphery of the second magnetic yoke 43. The first magnetism collection ring 44 induces magnetic flux from the first magnetic yoke 42. The second magnetism collection ring 45 induces magnetic flux from the second magnetic yoke 43.

The first magnetism collection ring 44 has a first ring portion 44a and a first magnetism collection portion 44b. The first ring portion 44a is provided in a C-shape curved along the outer peripheral surface of the first magnetic yoke 42. The first magnetism collection portion 44b has two fixed portions 44c and 44d, a coupling portion 44e, and two first magnetism collection projecting portions 44f and 44g. The two fixed portions 44c and 44d are attached to the outer peripheral surface of the first ring portion 44a. The two fixed portions 44c and 44d are curved along the outer peripheral surface of the first ring portion 44a. The coupling portion 44e couples the two fixed portions 44c and 44d to each other. A gap is provided between the inner surface of the coupling portion 44e and the outer peripheral surface of the first ring portion 44a. The two first magnetism collection projecting portions 44f and 44g are provided at an end portion of the coupling portion 44e on the side of the second magnetism collection ring 45. The two first magnetism collection projecting portions 44f and 44g extend toward the radially outer side of the first ring portion 44a.

The second magnetism collection ring 45 has a second ring portion 45a and two second magnetism collection projecting portions 45b and 45c. The second ring portion 45a is provided in a C-shape curved along the outer peripheral surface of the second magnetic yoke 43. The two second magnetism collection projecting portions 45b and 45c extend toward the radially outer side of the second ring portion 45a. The two second magnetism collection projecting portions 45b and 45c face the two first magnetism collection projecting portions 44f and 44g, respectively, of the first magnetism collection ring 44 in the axial direction X of the first pinion shaft 13.

The first torque sensor 46 and the second torque sensor 47 are provided on a substrate 61. The first torque sensor 46 is interposed between the first magnetism collection projecting portion 44f and the second magnetism collection projecting portion 45b. The second torque sensor 47 is interposed between the first magnetism collection projecting portion 44g and the second magnetism collection projecting portion 45c. The first torque sensor 46 and the second torque sensor 47 are magnetism sensors that detect magnetic flux induced by the first magnetism collection ring 44 and the second magnetism collection ring 45, respectively. The first torque sensor 46 and the second torque sensor 47 may be Hall sensors, for example.

When the torsion bar of the first pinion shaft 13 is deformed to be twisted through an operation of the steering wheel 11, the relative position of the multi-pole magnet 48 and the first magnetic yoke 42 in the rotational direction and the relative position of the multi-pole magnet 48 and the second magnetic yoke 43 in the rotational direction are varied. Accordingly, the density of magnetic flux induced from the multi-pole magnet 48 to the first magnetism collection ring 44 through the first magnetic yoke 42 is varied. In addition, the density of magnetic flux induced from the multi-pole magnet 48 to the second magnetism collection ring 45 through the second magnetic yoke 43 is also varied. The first torque sensor 46 and the second torque sensor 47 generate an electric signal that matches the magnetic flux density. The control device 25 illustrated in FIG. 1 computes torque that acts on the torsion bar as the steering torque Th on the basis of the electric signals which are generated by the first torque sensor 46 and the second torque sensor 47.

Figure 4:
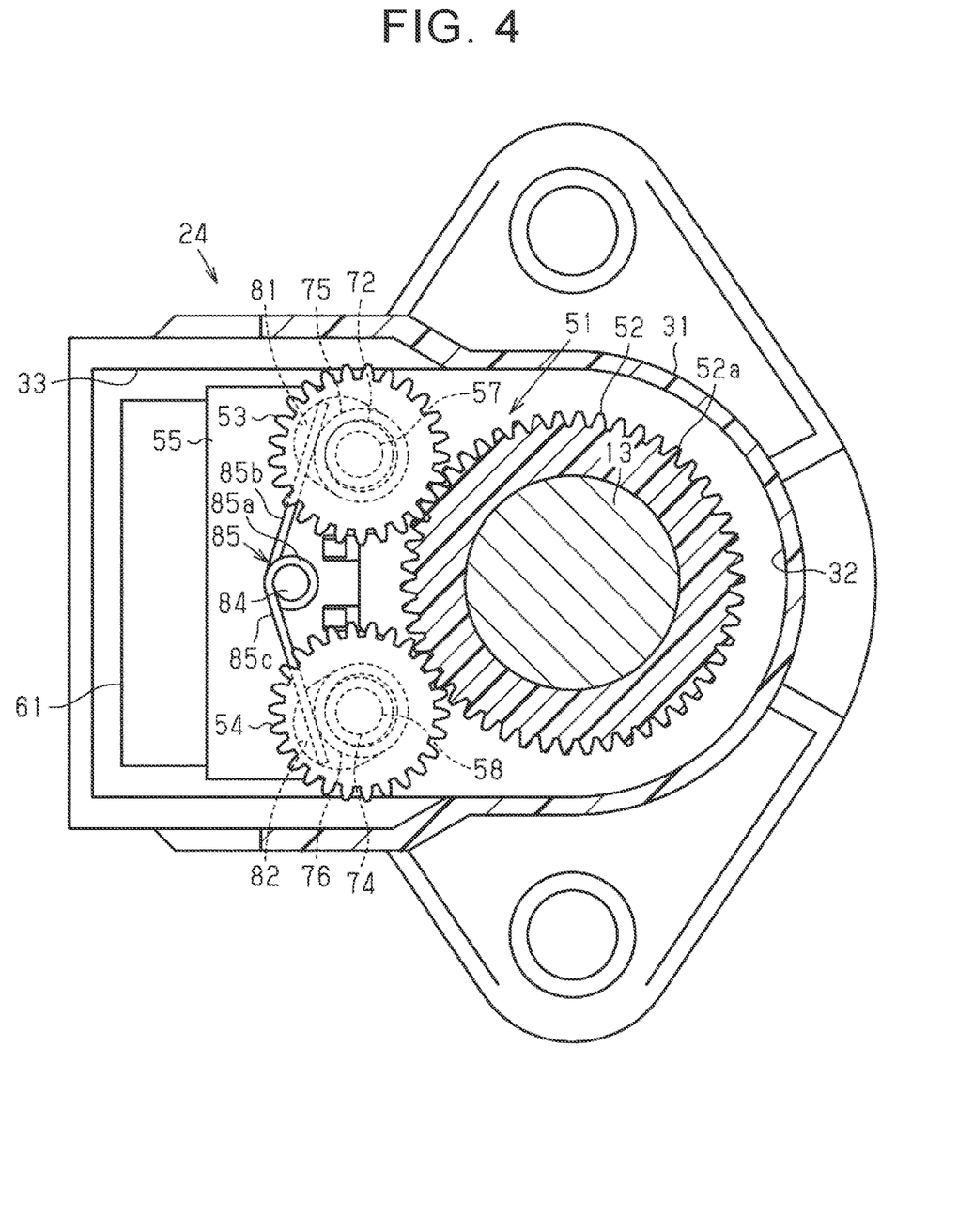
FIG. 4 is a sectional view of the sensor device according to the first embodiment taken along a plane including a line that is orthogonal to the axis of the first pinion shaft and between a support member and a cover plate and seen from the upper side of the drawing sheet surface of FIG. 2.

As illustrated in FIGS. 2 and 4, the rotational angle sensor device 51 has a main driving gear 52, a first driven gear 53, a second driven gear 54, a support member 55, the substrate 61, a stopper 83, a first magnetic shield 75, a second magnetic shield 76, a biasing member 85, a first rotational angle sensor 62, and a second rotational angle sensor 63. The main driving gear 52 is provided so as to be rotatable together with the input shaft of the first pinion shaft 13. The main driving gear 52 is formed in a cylindrical shape with a plurality of teeth 52a formed on the outer peripheral surface thereof and with the input shaft of the first pinion shaft 13 fitted with the inner peripheral surface thereof. The first driven gear 53 and the second driven gear 54 are meshed with the main driving gear 52. The first driven gear 53 and the second driven gear 54 are made of a resin. Examples of a resin material that constitutes the first driven gear 53 and the second driven gear 54 include a thermoplastic resin such as engineering plastic. The substrate 61 is provided on the inner bottom surface of the housing portion 33 of the sensor housing 31.

Figure 5:
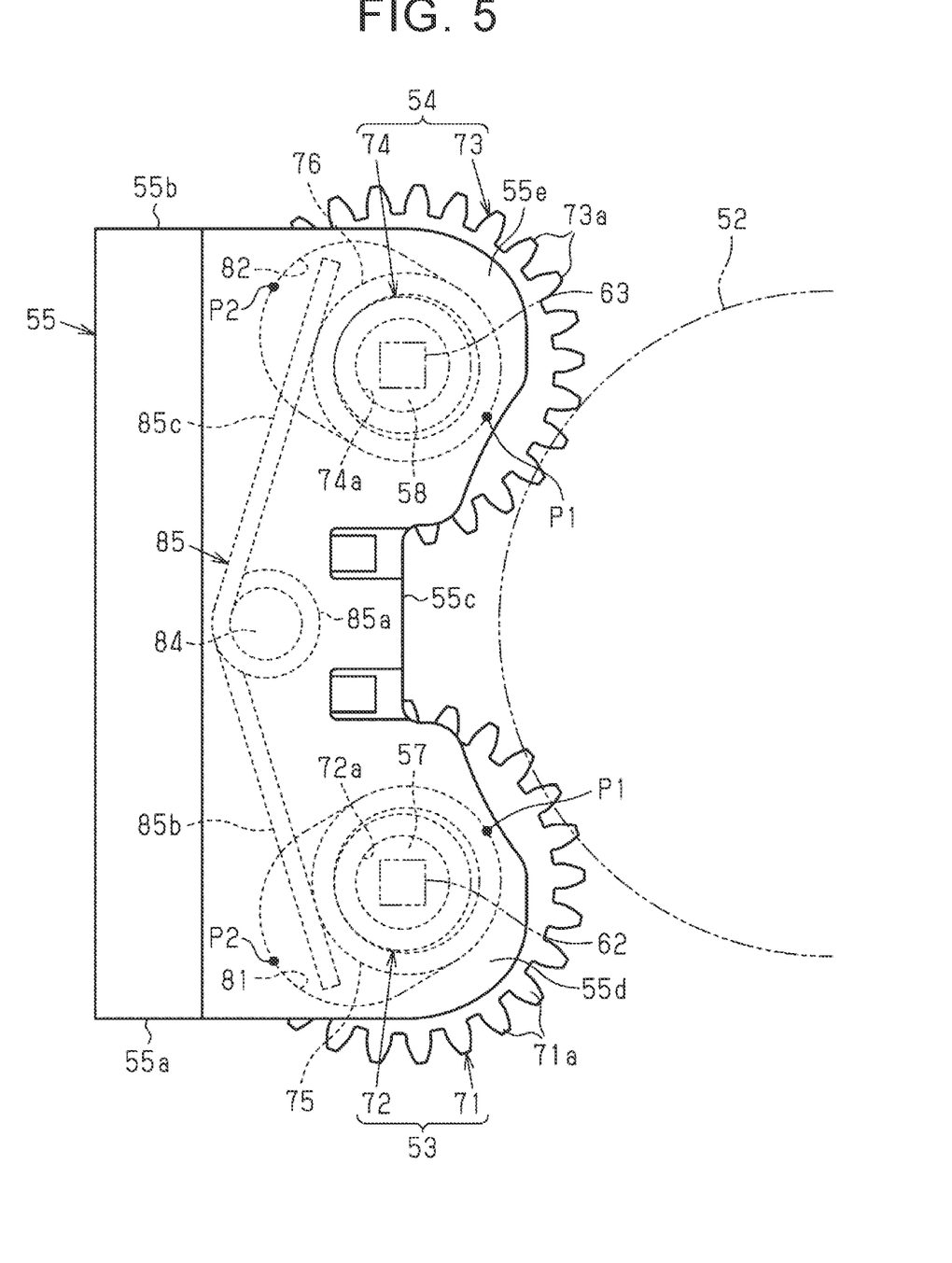
FIG. 5 is a sectional view of the sensor device according to the first embodiment taken along a plane including a line that is orthogonal to the axis of the first pinion shaft and between the support member and a substrate and seen from the lower side of the drawing sheet surface of FIG. 2.

As illustrated in FIGS. 4 and 5, the support member 55 rotatably supports the first driven gear 53 and the second driven gear 54. The support member 55 is attached to the inside of the housing portion 33 of the sensor housing 31. The support member 55 is formed in a rectangular plate shape. A long side surface 55c of the support member 55 faces the main driving gear 52. The support member 55 has a first support hole 81 and a second support hole 82. The first support hole 81 and the second support hole 82 are holes that extend in the support member 55 in the axial direction X of the first pinion shaft 13. The first support hole 81 is provided in the vicinity of a first corner portion 55d at which a first short side surface 55a of the support member 55 and the long side surface 55c on the side of the main driving gear 52 cross each other. The second support hole 82 is provided in the vicinity of a second corner portion 55e at which a second short side surface 55b of the support member 55 and the long side surface 55c on the side of the main driving gear 52 cross each other. The first support hole 81 and the second support hole 82 are formed in the shape of a long hole that extends along the radial direction of the main driving gear 52 as seen in the axial direction X of the first pinion shaft 13. The separation distance between the first support hole 81 and the second support hole 82 is shortest on the side of the main driving gear 52, and is longer at a location farther away from the main driving gear 52.

As illustrated in FIGS. 2 and 5, the first driven gear 53 has a gear portion 71 in a circular plate shape and a shaft portion 72 in a circular column shape. A plurality of teeth 71a are provided on the outer peripheral surface of the gear portion 71. The teeth 71a of the gear portion 71 are meshed with the teeth 52a of the main driving gear 52. One end surface of the shaft portion 72 is connected to the middle of a surface 71b of the gear portion 71 on the side of the substrate 61. The outside diameter of the shaft portion 72 is set to be smaller than the outside diameter of the gear portion 71. The other end surface of the shaft portion 72 on the side of the substrate 61 is provided with a recessed portion 72a. The recessed portion 72a is formed to have a circular cross-sectional shape in a direction that is orthogonal to the axial direction of the shaft portion 72. A first permanent magnet 57 is disposed in the recessed portion 72a. The first permanent magnet 57 is magnetized such that magnetic poles with different polarities are arranged side by side alternately in the circumferential direction. The first permanent magnet 57 is rotated together with the first driven gear 53. The second driven gear 54 has a gear portion 73 in a circular plate shape and a shaft portion 74 in a circular column shape. The other end surface of the shaft portion 74 on the side of the substrate 61 is provided with a recessed portion 74a. The recessed portion 74a is formed to have a circular cross-sectional shape in a direction that is orthogonal to the axial direction of the shaft portion 74. A second permanent magnet 58 is disposed in the recessed portion 74a. The first driven gear 53 and the second driven gear 54 are formed in the same shape excluding the fact that the number of teeth 73a of the gear portion 73 of the second driven gear 54 and the number of the teeth 71a of the gear portion 71 of the first driven gear 53 are different from each other.

The outer peripheral surface of the shaft portion 72 of the first driven gear 53 is surrounded by the first magnetic shield 75 which is formed in a cylindrical shape. The first magnetic shield 75 is constituted from a metal material that can block magnetism, and blocks the magnetism of the first permanent magnet 57, which is fitted in the recessed portion 72a, from leaking in the radial direction. Examples of the metal material which constitutes the first magnetic shield 75 include iron. The length of the first magnetic shield 75 in the axial direction X is set to be approximately equal to the length of the shaft portion 72 in the axial direction X. The inside diameter of the first magnetic shield 75 is set to be larger than the outside diameter of the shaft portion 72. The first magnetic shield 75 is housed in the first support hole 81 which is formed in the support member 55. The shaft portion 72 is rotatable in the first magnetic shield 75. Movement of the first magnetic shield 75 toward the substrate 61 is regulated by the biasing force of the biasing member 85 to be discussed later, and regulated by abutment against the inner bottom surface of the first support hole 81. The first magnetic shield 75 is movable between a first position P1 and a second position P2 along the inner peripheral surface of the first support hole 81. The first position P1 is a position at which the first magnetic shield 75 abuts against a portion of the inner peripheral surface of the first support hole 81 on the side closer to the main driving gear 52. The second position P2 is a position at which the first magnetic shield 75 abuts against a portion of the inner peripheral surface of the first support hole 81 on the side farther from the main driving gear 52.

The outer peripheral surface of the shaft portion 74 of the second driven gear 54 is surrounded by the second magnetic shield 76 which is formed in a cylindrical shape. The second magnetic shield 76 is housed in the second support hole 82 which is formed in the support member 55. The second magnetic shield 76 has the same shape as the first magnetic shield 75. The positional relationship between the second magnetic shield 76 and the second support hole 82 is the same as the positional relationship between the first magnetic shield 75 and the first support hole 81.

As illustrated in FIG. 2, the stopper 83 in a plate shape is mounted to the support member 55. The stopper 83 is disposed on a surface of the support member 55 on the opposite side of the support member 55 from the substrate 61, and covers respective surfaces of the first driven gear 53 and the second driven gear 54 on the opposite side of the first driven gear 53 and the second driven gear 54 from the substrate 61. Movement of the first driven gear 53 and the second driven gear 54 toward the opposite side of the substrate 61 is regulated by the gear portion 71 and the gear portion 73 abutting against the stopper 83.

As illustrated in FIG. 4, a column portion 84 in a circular column shape is provided on a surface of the support member 55 on the opposite side of the support member 55 from the substrate 61. The column portion 84 is provided at a position between the first support hole 81 and the second support hole 82 in the longitudinal direction of the support member 55, and at a position farther away from the main driving gear 52 than the first support hole 81 and the second support hole 82 in the short-length direction of the support member 55. The biasing member 85 is mounted on the column portion 84 to be supported by the support member 55. The biasing member 85 may be a torsion coil spring made of metal. Examples of a metal material that constitutes the biasing member 85 include iron.

As illustrated in FIG. 5, the biasing member 85 is formed in a generally V-shape as a whole. The biasing member 85 is provided with a coil portion 85a provided at the middle portion thereof and wound a plurality of times and a first arm portion 85b and a second arm portion 85c provided at both end portions thereof and extending straight. The coil portion 85a in a circular ring shape is fitted with the column portion 84. The first arm portion 85b is connected to one end portion of the coil portion 85a. The second arm portion 85c is connected to the other end portion of the coil portion 85a. The first arm portion 85b abuts against a portion of the first magnetic shield 75 on the opposite side of the first magnetic shield 75 from the main driving gear 52. The second arm portion 85c abuts against a portion of the second magnetic shield 76 on the opposite side of the second magnetic shield 76 from the main driving gear 52. The first arm portion 85b and the second arm portion 85c are elastically deformable so as to reduce the angle between the first arm portion 85b and the second arm portion 85c around the coil portion 85a. The first magnetic shield 75 and the second magnetic shield 76 are always biased by the elastic force of the biasing member 85 in the direction of moving closer toward the main driving gear 52. Consequently, the shaft portion 72 which is supported in the first magnetic shield 75 so as to be capable of sliding rotation is always biased in the direction of moving closer toward the main driving gear 52. Movement of the first driven gear 53 closer toward the main driving gear 52 is regulated by the main driving gear 52 and the first driven gear 53 being suitably meshed with each other. In addition, the shaft portion 74 which is supported in the second magnetic shield 76 so as to be capable of sliding rotation is always biased in the direction of moving closer toward the main driving gear 52. Movement of the second driven gear 54 closer toward the main driving gear 52 is regulated by the main driving gear 52 and the second driven gear 54 being suitably meshed with each other. Being "suitably meshed" refers to being meshed such that the rotational force of the main driving gear 52 can be fully transferred to the first driven gear 53, and refers to being meshed such that the rotational force of the main driving gear 52 can be fully transferred to the second driven gear 54. The coefficient of friction between the first magnetic shield 75 and the shaft portion 72 of the first driven gear 53 is set to be smaller than the coefficient of friction between the first magnetic shield 75 and the first arm portion 85b of the biasing member 85. Consequently, the sliding resistance between the first magnetic shield 75 and the shaft portion 72 of the first driven gear 53 is lower than the sliding resistance between the first magnetic shield 75 and the first arm portion 85b of the biasing member 85, and therefore the shaft portion 72 is rotatable more easily than the first magnetic shield 75. In addition, the coefficient of friction between the second magnetic shield 76 and the shaft portion 74 of the second driven gear 54 is set to be smaller than the coefficient of friction between the second magnetic shield 76 and the second arm portion 85c of the biasing member 85. Consequently, the sliding resistance between the second magnetic shield 76 and the shaft portion 74 of the second driven gear 54 is lower than the sliding resistance between the second magnetic shield 76 and the second arm portion 85c of the biasing member 85, and therefore the shaft portion 74 is rotatable more easily than the second magnetic shield 76.

As illustrated in FIG. 2, the first rotational angle sensor 62 and the second rotational angle sensor 63 are mounted on a surface of the substrate 61 on the side of the first driven gear 53 and the second driven gear 54. The first rotational angle sensor 62 faces the first permanent magnet 57 in the axial direction X. The second rotational angle sensor 63 faces the second permanent magnet 58 in the axial direction X. The first rotational angle sensor 62 and the second rotational angle sensor 63 may be Hall sensors, for example.

When the first pinion shaft 13 is rotated through an operation of the steering wheel 11, the first driven gear 53 and the second driven gear 54 are rotated through meshing with the main driving gear 52. Accordingly, the density of magnetic flux input from the first permanent magnet 57 of the first driven gear 53 to the first rotational angle sensor 62 is varied, and the density of magnetic flux input from the second permanent magnet 58 of the second driven gear 54 to the second rotational angle sensor 63 is varied. The first rotational angle sensor 62 and the second rotational angle sensor 63 are each a magnetic sensor that generates an electric signal that matches the magnetic flux density. The control device 25 illustrated in FIG. 1 computes the rotational angle of the first driven gear 53 on the basis of the electric signal which is generated by the first rotational angle sensor 62, and computes the rotational angle of the second driven gear 54 on the basis of the electric signal which is generated by the second rotational angle sensor 63. The control device 25 computes the rotational angle θpa of the first pinion shaft 13 as the steering angle θs on the basis of the thus computed rotational angles.

The functions and the effects of the present embodiment will be described.

(1) The rotational angle sensor device 51 of the sensor device 24 detects the rotational angle of the main driving gear 52 through detection of rotation of the first driven gear 53 and the second driven gear 54 which are meshed with the main driving gear 52. Therefore, in the case where the main driving gear 52 starts rotating or the rotational direction thereof is reversed, looseness due to backlash between the main driving gear 52 and the first driven gear 53 and backlash between the main driving gear 52 and the second driven gear 54 may affect the precision in computing the respective rotational angles of the first driven gear 53 and the second driven gear 54, and hence affect the precision in computing the rotational angle of the main driving gear 52. Thus, in the present embodiment, the biasing member 85 biases the first driven gear 53 and the second driven gear 54 toward the main driving gear 52 via the first magnetic shield 75 and the second magnetic shield 76. Consequently, the first driven gear 53 and the second driven gear 54 are maintained in the state of being pressed against the main driving gear 52 by the elastic force of the biasing member 85. Therefore, more suitable meshing can be secured between the main driving gear 52 and the first driven gear 53 and between the main driving gear 52 and the second driven gear 54. The precision in computing the rotational angle of the main driving gear 52 can be improved in accordance with an amount by which the looseness due to the backlash is suppressed.

However, when the first driven gear 53 and the second driven gear 54 are pressed against the main driving gear 52 by the biasing member 85, friction is generated between the biasing member 85 and the first driven gear 53 and between the biasing member 85 and the second driven gear 54. If the friction becomes larger, torque required for the driver to operate the steering wheel 11 is increased. In the present embodiment, the biasing member 85 biases the first driven gear 53 toward the main driving gear 52 via the first magnetic shield 75. Since the biasing member 85 biases the first driven gear 53 via the first magnetic shield 75, it is possible to set the friction during rotation of the first driven gear 53 to be small compared to the case where the shaft portion 72 of the first driven gear 53 is directly biased with no first magnetic shield 75 provided between the first driven gear 53 and the biasing member 85. Since the coefficient of friction between the first magnetic shield 75 and the first driven gear 53 is smaller than the coefficient of friction between the first magnetic shield 75 and the biasing member 85, it is possible to suppress an increase in torque required for the driver to operate the steering wheel 11. The setting of the coefficient of friction between the second magnetic shield 76 and the shaft portion 74 of the second driven gear 54 is also the same as the setting of the coefficient of friction between the first magnetic shield 75 and the shaft portion 72 of the first driven gear 53. Thus, it is possible to both achieve suitable meshing between the main driving gear 52 and the first driven gear 53 and between the main driving gear 52 and the second driven gear 54 and suppress an increase in torque required to operate the steering wheel 11.

(2) It is only necessary to provide a single member as the biasing member 85 which biases the first driven gear 53 and the second driven gear 54 toward the main driving gear 52 at all times, and therefore an increase in the number of parts of the sensor device 24 can be suppressed.

(3) The sensor device 24 can detect not only the rotational angle θpa of the first pinion shaft 13, but also torque that acts on the first pinion shaft 13 as the steering torque Th.

(4) The outer peripheral surface of the shaft portion 72 of the first driven gear 53 is surrounded by the first magnetic shield 75. Thus, it is possible to block magnetism of the first permanent magnet 57 from leaking in the radial direction, and suppress any magnetism that has leaked from entering the first torque sensor 46 and the second torque sensor 47. In addition, the outer peripheral surface of the shaft portion 74 of the second driven gear 54 is surrounded by the second magnetic shield 76. Thus, it is possible to block magnetism of the second permanent magnet 58 from leaking in the radial direction, and suppress any magnetism that has leaked from entering the first torque sensor 46 and the second torque sensor 47. Therefore, a reduction in the precision in computing the steering torque Th can be suppressed.

The present embodiment may be modified as follows. The following other embodiments can be combined with each other unless such embodiments technically contradict with each other. The first support hole 81 and the second support hole 82 may each be a through hole that penetrates the support member 55 in the axial direction X.

The first permanent magnet 57 may be attached to an end surface of the shaft portion 72 on the side of the substrate 61. In addition, the second permanent magnet 58 may be attached to an end surface of the shaft portion 74 on the side of the substrate 61. In the present embodiment, a torsion coil spring is adopted as the biasing member 85 which biases the first driven gear 53 and the second driven gear 54 against the main driving gear 52. However, the applicable embodiment is not limited thereto, and a plate spring or a different coil spring may also be adopted as the biasing member. For example, a biasing member that biases the first driven gear 53 against the main driving gear 52 and a biasing member that biases the second driven gear 54 against the main driving gear 52 may be constituted as separate biasing members.

The entirety of the first driven gear 53 is made of a resin. However, it is only necessary that at least a portion the first driven gear 53 that contacts the first magnetic shield 75, that is, at least the outer peripheral surface of the shaft portion 72, should be made of a resin, and it is not necessary that the gear portion 71 and the inside of the shaft portion 72 should be made of a resin. The same also applies to the second driven gear 54.

The first magnetic shield 75 and the biasing member 85 are made of metal, and the first driven gear 53 is made of a resin. However, the applicable embodiment is not limited thereto. The first magnetic shield 75, the first driven gear 53, and the biasing member 85 may be constituted from any material as long as the coefficient of friction between the first magnetic shield 75 and the first driven gear 53 is smaller than the coefficient of friction between the first magnetic shield 75 and the biasing member 85. The same also applies to the second magnetic shield 76 and the second driven gear 54. However, it is necessary to adopt a material that can block magnetism for the first magnetic shield 75 and the second magnetic shield 76.

The first rotational angle sensor 62 and the second rotational angle sensor 63 of the rotational angle sensor device 51 are Hall sensors. However, such sensors may be magneto-resistance sensors. In addition, the first torque sensor 46 and the second torque sensor 47 of the torque sensor device 41 are Hall sensors. However, such sensors may be magneto-resistance sensors.

In the present embodiment, the sensor device may be a rotational angle sensor device 51 obtained by removing a torque sensor device 41 from a sensor device 24. The rotational angle sensor device 51 also has the same issue as the sensor device 24.

The rotational angle sensor device 51 may be configured to have a single driven gear, or may be configured to have three or more driven gears. In the present embodiment, the sensor device 24 or the rotational angle sensor device discussed above is mounted on the steering device 10 for the vehicle, for example. However, such a device may be applied to other in-vehicle devices that have a rotary shaft. In addition, the sensor device 24 or the rotational angle sensor device is not limited to use for vehicles.

What is claimed is:

1. A sensor device comprising:
   a main driving gear provided so as to be rotatable together with a rotary shaft as a detection target;
   a driven gear that includes a gear portion meshed with teeth of the main driving gear and a shaft portion that projects from a side surface of the gear portion, the shaft portion being provided with a permanent magnet;
   a biasing member configured to bias the driven gear toward the main driving gear;
   a support member that supports the driven gear and the biasing member;
   a rotational angle sensor configured to generate an electric signal based on rotation of the driven gear; and
   a magnetic shield that rotatably surrounds the shaft portion, wherein:
   the biasing member biases the driven gear toward the main driving gear by biasing the magnetic shield toward the main driving gear; and
   a sliding resistance between the magnetic shield and the driven gear is lower than a sliding resistance between the magnetic shield and the biasing member, wherein the coefficient of friction between the magnetic shield and the driven gear is smaller than the coefficient of friction between the magnetic shield and the biasing member.

2. The sensor device according to claim 1, wherein:
   a plurality of the driven gears are provided, and the number of the plurality of the driven gears is two; and
   the biasing member includes a coil portion supported by the support member, a first arm portion that biases one of the driven gears toward the main driving gear, and a second arm portion that biases the other of the driven gears toward the main driving gear.

3. The sensor device according to claim 1, further comprising a torque sensor that detects torque that acts on the rotary shaft.

* * * * *